US012585136B2

(12) United States Patent
Kumkar et al.

(10) Patent No.: US 12,585,136 B2
(45) Date of Patent: Mar. 24, 2026

(54) COMBINATION DEVICE AND OPTICAL SYSTEM

(71) Applicant: TRUMPF Laser- und Systemtechnik GmbH, Ditzingen (DE)

(72) Inventors: Malte Kumkar, Weimar (DE); Daniel Grossmann, Schramberg (DE)

(73) Assignee: TRUMPF LASER- UND SYSTEMTECHNIK GMBH, Ditzingen (DE)

( * ) Notice: Subject to any disclaimer, the term of this patent is extended or adjusted under 35 U.S.C. 154(b) by 286 days.

(21) Appl. No.: 18/489,877

(22) Filed: Oct. 19, 2023

(65) Prior Publication Data

US 2024/0045222 A1 Feb. 8, 2024

Related U.S. Application Data

(63) Continuation of application No. PCT/EP2022/060685, filed on Apr. 22, 2022.

(30) Foreign Application Priority Data

Apr. 23, 2021 (DE) .......................... 102021204057.8

(51) Int. Cl.
*G02B 27/28* (2006.01)
*G02B 27/14* (2006.01)

(52) U.S. Cl.
CPC ......... *G02B 27/281* (2013.01); *G02B 27/144* (2013.01); *G02B 27/283* (2013.01); *G02B 27/286* (2013.01)

(58) Field of Classification Search
CPC .................................................... G02B 27/281
See application file for complete search history.

(56) References Cited

U.S. PATENT DOCUMENTS

| | | | |
|---|---|---|---|
| 6,856,459 | B1 | 2/2005 | Islam et al. |
| 8,248,700 | B1 | 8/2012 | Zorabedian |
| 11,440,136 | B2 | 9/2022 | Gauch et al. |

(Continued)

FOREIGN PATENT DOCUMENTS

| | | |
|---|---|---|
| CN | 106569340 A | 4/2017 |
| CN | 109212772 A | 1/2019 |

(Continued)

OTHER PUBLICATIONS

Lei, Y. et al., "High speed ultrafast laser anisotropic nanostructuring by energy deposition control via near-field enhancement," 2021, pp. 1365-1371, vol. 8, Issue 11, Optica Publishing Group, Washington DC, USA.

*Primary Examiner* — Edmond C Lau

(74) *Attorney, Agent, or Firm* — LEYDIG, VOIT & MAYER, LTD.

(57) ABSTRACT

A combination device includes at least two inputs and one or more outputs. Each input is for entry of a respective input beam. Each output is for exit of a respective output beam. The combination device is configured to form the respective output beam through a coherent combination of two input beams. The combination device is configured to set a polarization direction of the respective output beam based on a relative phase position of individual phases of the two input beams from which the respective output beam is formed through the coherent combination.

16 Claims, 2 Drawing Sheets

(56)          References Cited

U.S. PATENT DOCUMENTS

| | | |
|---|---|---|
| 11,796,720 B2 | 10/2023 | Tillkorn et al. |
| 2007/0086010 A1 | 4/2007 | Rothenberg |
| 2009/0219960 A1 | 9/2009 | Uberna et al. |
| 2014/0293254 A1 | 10/2014 | Komatsuda |
| 2017/0219775 A1 | 8/2017 | Chen |
| 2017/0261689 A1 | 9/2017 | Mansouri Rad et al. |
| 2018/0269648 A1* | 9/2018 | Robinson ........... G02B 27/1006 |
| 2020/0336211 A1 | 10/2020 | Zhang et al. |
| 2021/0119707 A1 | 4/2021 | Dong |
| 2021/0265797 A1 | 8/2021 | Sakakura et al. |
| 2022/0268983 A1 | 8/2022 | Sakakura et al. |
| 2024/0045222 A1 | 2/2024 | Kumkar et al. |

FOREIGN PATENT DOCUMENTS

| | | |
|---|---|---|
| CN | 117178442 A | 12/2023 |
| DE | 102017104392 A1 | 9/2018 |
| DE | 102017203655 A1 | 9/2018 |
| DE | 102018211971 A1 | 1/2020 |
| EP | 2696525 A1 | 2/2014 |
| WO | 2006104704 A1 | 10/2006 |
| WO | WO 2021038225 A1 | 3/2021 |

* cited by examiner

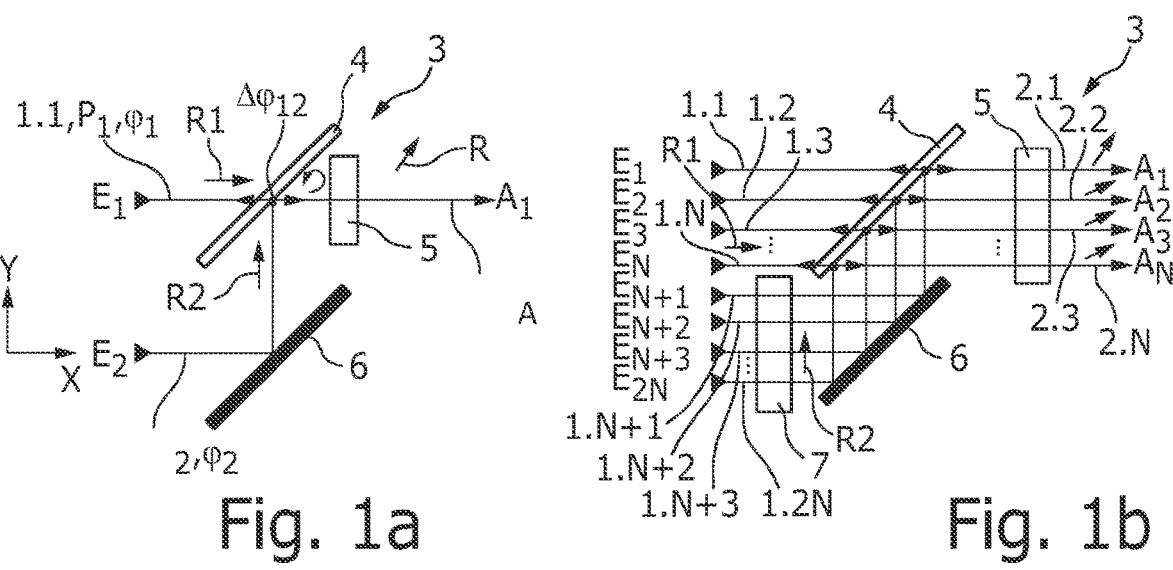
Fig. 1a
Fig. 1b
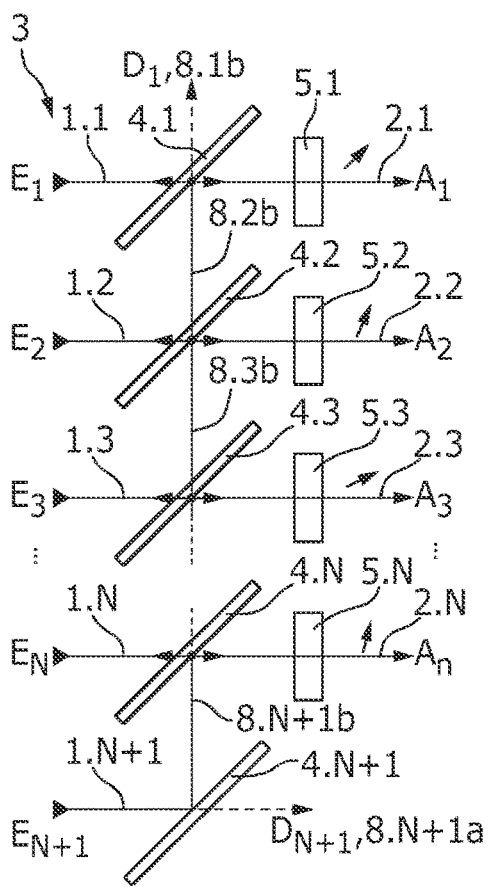
Fig. 2a
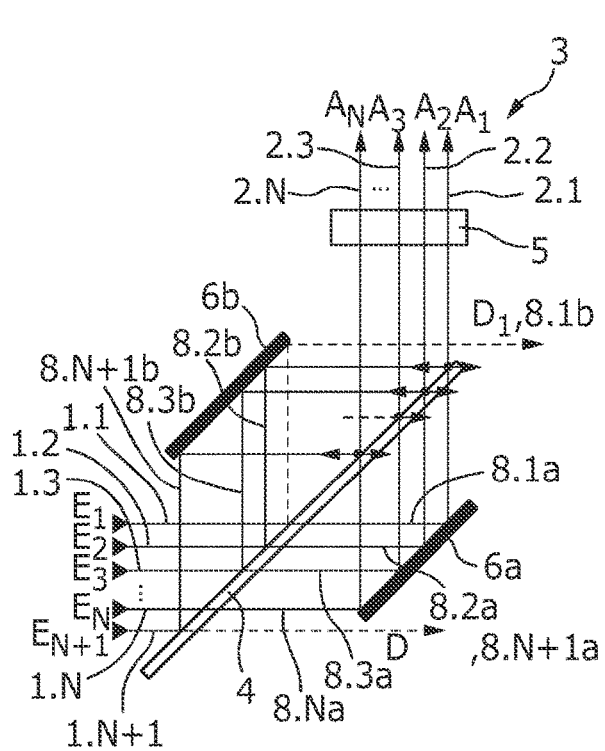
Fig. 2b

COMBINATION DEVICE AND OPTICAL SYSTEM

CROSS REFERENCE TO RELATED APPLICATIONS

This application is a continuation of International Application No. PCT/EP2022/060685 (WO2022/223780 A2), filed on Apr. 22, 2022, and claims benefit to German Patent Application No. DE 102021204057.8, filed on Apr. 23, 2021. The aforementioned applications are hereby incorporated by reference herein.

FIELD

Embodiments of the present invention relate to a combination device for combining two input beams.

BACKGROUND

The generally mutually coherent input beams and the one or more output beams formed in the coherent combination are typically laser beams. The combination device described here is preferably designed to superimpose the input beams collinearly, wherein in particular a congruent superposition may take place to form the or a respective output beam.

The interaction of laser radiation with an object to be processed (workpiece, target, substrate, etc.) depends on a large number of laser parameters, for example on wavelength, on intensity or power, on pulse duration, on repetition rate, on pulse shape or also on other parameters such as beam shape. Depending on the type of object to be processed, the polarization of the laser radiation may also have an influence on the interaction. It may therefore be important for some applications to set the polarization in a targeted manner. In this case, rapid polarization switching is generally required to increase productivity. By way of example, applications such as data storage in a medium may thus be implemented in a productive manner.

Rapid polarization modulation may generally be implemented using interferometric systems, into which a single input beam is coupled and in which the phase is manipulated by phase shifters integrated into the interferometer; see for example the article "The rotating linearly polarized light from a polarizing Mach-Zehnder Interferometer: Production and applications", C. Pawong et al., Opt. Lasers Tec. 43, 461-468 (2011), or the article "Investigation of the use of rotating linearly polarized light for characterizing SiO2 thin-film on Si substrate", C. Pawong et al., in: Optoelectronic Materials and Devices, G. Duan, ed., Vol. 8308 of Proceedings of SPIE (2011), paper 830811, or DE 10 2017 104 392 A1.

US 2009/0219960 A1 describes an apparatus for superimposing laser beams, which has a phase and polarization module that is designed to provide a plurality of laser beams that are polarized in a phase-locked and pairwise-orthogonal manner. The apparatus comprises a control unit that is designed to control the phase and the polarization of each laser beam, and a beam combiner for combining a first and a second of the laser beams so as to generate an output laser beam.

SUMMARY

Embodiments of the present invention provide a combination device. The combination device includes at least two inputs and one or more outputs. Each input is for entry of a respective input beam. Each output is for exit of a respective output beam. The combination device is configured to form the respective output beam through a coherent combination of two input beams. The combination device is configured to set a polarization direction of the respective output beam based on a relative phase position of individual phases of the two input beams from which the respective output beam is formed through the coherent combination.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1a shows a schematic illustration of a combination device having a polarization beam splitter and a λ/4 retardation device for coherently combining two mutually coherent input beams to form an output beam according to some embodiments;

FIG. 1b shows a schematic illustration analogous to FIG. 1a, which is designed to coherently combine in each case two of a number of 2N input beams to form one of N output beams according to some embodiments;

FIG. 2a and FIG. 2b show schematic illustrations of two combination devices, which are designed to split N+1 input beams into in each case two partial beams and to coherently combine in each case two partial beams of different input beams to form one of N output beams according to some embodiments;

DETAILED DESCRIPTION

Figures 3A, 3B, 4:
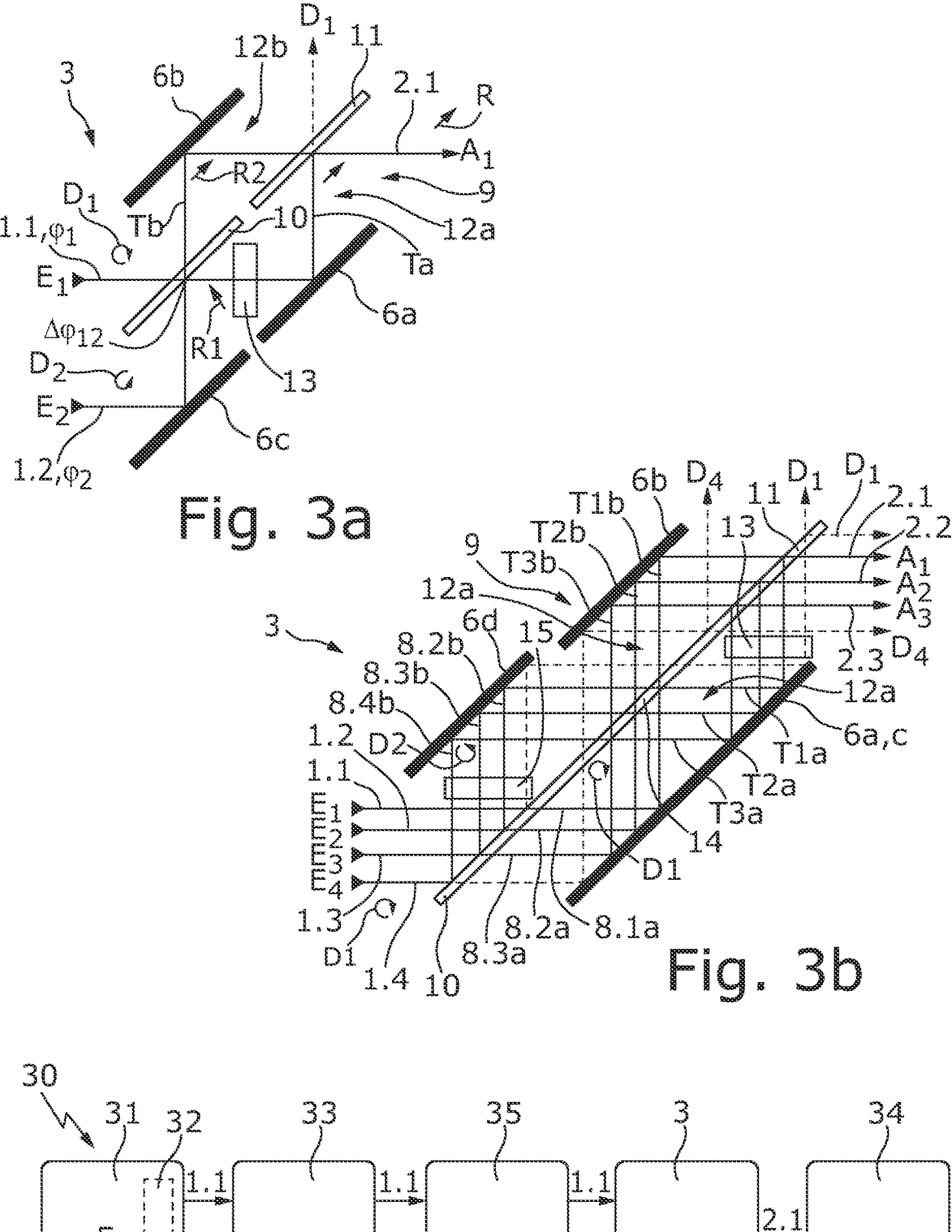
FIG. 3a shows a schematic illustration of a combination device having a Mach-Zehnder interferometer for coherently combining two mutually coherent input beams to form an output beam according to some embodiments.
FIG. 3b shows a schematic illustration of a combination device analogous to FIG. 3a, which is designed to split N+1 input beams into in each case two partial beams and to coherently combine in each case two partial beams of different input beams to form one of N output beams according to some embodiments.
FIG. 4 shows a schematic illustration of an optical system having a combination device according to FIG. 1a according to some embodiments.

Embodiments of the present invention provide a combination device and an optical system having at least one such combination device, both of which allow rapid setting of the polarization state of at least one output beam.

According to embodiments of the invention, a combination device is designed to set a polarization state, in particular a polarization direction, of the respective (or of the) output beam on the basis of a relative phase position of the individual phases of the two input beams from which the respective output beam is formed through the coherent combination.

The coherent combination of (in each case) two of the input beams makes it possible in this case to rapidly modulate or manipulate the properties of the or a respective output beam by rapidly manipulating the relative phase position of the input beams. In the simplest case, the combination device according to embodiments of the invention has two inputs and one output and is designed to combine the two input beams entering at the inputs coherently to form (exactly) one output beam exiting at the (exactly one) output.

As an alternative, the combination device has more than two inputs and more than one output. In this case, the combination device is designed to form a respective output beam through a coherent combination of in each case two of the input beams entering at the more than two inputs. The polarization state, in particular the polarization direction, of the respective output beam is also determined in this case (only) by the relative phase position of the two input beams from which the output beam is formed in the coherent combination, that is to say the relative phase position of the other input beams has no influence on the polarization state of this output beam. The polarization state of a respective output beam exiting at one of the outputs may thereby be set independently of the polarization state of the output beams exiting at the other outputs.

The combination device may be a passive device that has no optical elements whose optical properties are able to be set. In the event that the combination device has optical elements whose optical properties are able to be set, for example phase shifters, optical rotators, etc., such setting is generally not used to dynamically set or modulate the polarization state and, where applicable, the power of the output beam, but rather typically only to correct unwanted, for example temperature-related changes in the optical properties of the optical components of the combination device, in order thereby for example to enable complete constructive interference of the input beams. The combination device may have conventional optical components for the coherent combination. However, an implementation on the basis of a PIC ("Photo Integrated Circuit") is likewise possible.

The polarization state of the (respective) output laser beam is typically set solely by setting or specifying the relative phase position of the individual phases of the in each case two coherently combined input beams in relation to one other. The absolute phase of the input beams does not play any role in the superposition, and so one phase modulation unit for each pair of superimposed input beams is generally sufficient to set the relative phase position. The polarization state of the (respective) output beam may be set in a highly dynamic manner, with switching durations for example in the MHz range, by specifying or setting the (relative) phase positions of the input beams with the aid of the phase modulation unit.

The arrangement of a phase modulation unit upstream of the combination device means that it is not necessary for the phase modulation unit to provide the output beam with the required output parameters directly from an input beam. This makes it possible for example to use lower-performance components for the modulation of the relative phase positions, by virtue of achieving the power required for the combination device using an amplifier stage connected downstream of the phase modulation unit. In addition, in the case of input beams that are generated by an ultrashort pulse laser, the power in the phase modulation unit may be reduced by switching temporally stretched pulses. Optical components having increased losses may also be used without having an excessively negative effect on the efficiency of the overall system. The relative phase positions of the input beams may additionally be modulated at a wavelength different from the wavelength of the output beam.

In one embodiment, the combination device has exactly two inputs and one output and comprises a polarization beam splitter for coherently combining the two input beams entering at the inputs to form the output beam, and a phase shift element, in particular a $\lambda/4$ retardation device, arranged downstream of the polarization beam splitter in the beam path, for generating a linear polarization of the output beam. In this embodiment, the polarization of the two input beams is selected such that in each case the maximum power (ideally the total power) is transferred to the output beam. For this purpose, the polarization of the first input beam is typically selected such that its transmission at the polarization beam splitter is at a maximum, and the polarization of the second input beam is selected such that its reflection at the polarization beam splitter is at a maximum (or vice versa). This may be achieved in that the two input beams are each polarized linearly and perpendicular to one another and the one or more polarizer axes are oriented parallel to the two mutually perpendicular polarization directions of the input beams. The sum of the output powers of the two input beams may, in the loss-free case, be transferred to the power of the output beam (see above). The power/energy of the output beam may optionally be set through the additional synchronous adjustment of the power/energy of the two input beams.

Assuming input parameters selected for the coherent coupling with high interference contrast, in the coherent combination of the input beams entering the polarization beam splitter, in general, an elliptically polarized exiting beam is formed, in which the half-axes (preferred axes or directions) of the elliptical polarization are oriented at 45° to the two mutually perpendicular polarization directions of the input beams (when these are linearly polarized). As a result of an orientation of the preferred axis of a $\lambda/4$ retardation device matching the 45° preferred direction, the elliptical polarization is converted into a linear polarization whose polarization direction is determined by the principal axis ratio and the direction of rotation of the elliptical polarization. Setting the relative phase position between the input beams entering the polarization beam splitter changes the aspect ratio between the half-axes of the elliptical polarization, but does not change the orientation of the half-axes at 45° to the two mutually perpendicular polarization directions. Setting the relative phase position of the input beams therefore makes it possible to set the polarization direction of the linearly polarized output beam.

In one alternative embodiment, the combination device has two inputs and one output and comprises an interferometer, in particular a Mach-Zehnder interferometer, having a first beam channel for propagating a first partial beam and having a second beam channel for propagating a second partial beam, wherein the interferometer has a splitting element for splitting the two input beams into the two partial beams and a combination element for coherently combining the two partial beams to form the output beam, and preferably at least one polarization-influencing device for influencing, preferably in a fixedly prescribed manner, a polarization state, in particular a polarization direction, of at least one of the partial beams.

With the aid of an interferometer, in particular a Mach-Zehnder interferometer, the polarization state or the polarization direction of the output beam may be set through a controlled adjustment of the phases of the individual input beams. The interferometer generally has at least one optical component or a combination of optical components for phase and/or polarization adjustment between the two partial beams or between the two beam channels in order to ensure that, when the relative phase position of the two partial beams in relation to one another is selected appropriately, maximum constructive interference occurs at the combination element at which the coherent superposition of the two partial beams takes place. In this embodiment, the path length difference of the two partial beams in the interferometer is adjusted such that maximum constructive interference occurs, that is to say the sum of the powers of the two input beams, in the loss-free case, corresponds to the power of the output beam. To be able to set any angle of the polarization direction, the power of the two superimposed partial beams is selected to be the same, and deviating losses in the combination device, as in other embodiments as well, are compensated for beforehand by adjusting the power of the input partial beams appropriately.

In the embodiment described here, the interferometer preferably has at least one polarization-influencing device for influencing, in particular in a fixedly prescribed manner, a polarization state, in particular a polarization direction, of at least one of the partial beams. A suitable polarization-influencing device makes it possible to influence the polarization state of one or both partial beams such that maximum constructive interference occurs at the combination element in at least one phase position of the two partial beams relative to one another. Influencing the polarization state in a fixedly prescribed manner is understood to mean that there is no dynamic influencing of the polarization state, since the polarization state of the output beam is set dynamically solely through the setting of the relative phase positions of the input beams. However, the polarization-influencing device may in principle be designed to be controllable, in order to compensate for various parasitic losses in the two beam channels, thermal effects, etc.

The one or more polarization-influencing devices are preferably designed as polarization-rotating optical devices or elements (polarization rotators), in particular in the form of optical rotators, for example in the form of optical crystals, which, on account of their crystalline structure, when oriented appropriately, have an intrinsic polarization rotation, for example crystalline quartz, which exhibits high transparency and performance in a wide wavelength range from UV to NIR. In principle, Faraday rotators may also be used as polarization-influencing device. However, Faraday rotators require an external magnetic field for polarization rotation, and are therefore more complex to manufacture and operate than optical crystals. For the present application, it is expedient for a polarization rotation of the one or more partial beams to take place independently of the polarization direction of the respective partial beam. Such a polarization rotation is typically not possible with birefringent retardation devices, for example with $\lambda/2$ retardation elements, since these allow rotation of the polarization direction only in the event of a prescribed polarization direction of the respective partial beam.

The splitting element and the combination element may be designed for example as intensity beam splitters, and the interferometer may have, as polarization-influencing device, at least one polarization-rotating optical device, in particular an optical rotator, for orienting the polarization directions of the two partial beams perpendicular relative to one another. Within the meaning of this application, an intensity beam splitter is understood to mean a beam splitter that allows two or more partial beams to be split or combined in a manner substantially independent of their polarization state. The intensity beam splitters described here are generally designed as 50% beam splitters, that is to say they combine two beams entering the intensity beam splitter with the same weighting to form an exiting beam. The intensity beam splitter may be designed for example in the form of a dielectric layer system on the surface of a transparent substrate. With a suitable orientation of the surface with respect to the beam incidence direction, it is possible to achieve the desired polarization-independent reflectivity and transmission of essentially 50% in each case.

In the simplest case, to orient the polarization directions of the two partial beams, an optical rotator may be arranged in one of the two beam channels of the interferometer, which optical rotator brings about a rotation of the polarization direction of the partial beam propagating in this beam channel by 90°. However, it goes without saying that two or, where applicable, more than two polarization-rotating optical devices or elements may also be arranged in the beam channels of the interferometer in order to orient the polarization directions of the two partial beams at an angle of 90° relative to one another.

To form a linearly polarized output beam in the interferometer, it is usually desired for the two circularly polarized input beams having in each case an opposing direction of rotation to be supplied to the splitting element of the interferometer. In this case, the two partial beams in the beam channels each have a linear polarization having two polarization directions oriented perpendicular to one another. By rotating the polarization direction of one of the two partial beams by 90° in the optical rotator, the polarization directions of the two partial beams, which are combined coherently by the combination element, are oriented in parallel. In this case, the relative phase position of the two input beams may be used to set the polarization direction of this linearly polarized output beam.

In a further embodiment, the combination device has more than two inputs and more than one output and is designed to form a respective output beam exiting at an output through a coherent combination of in each case two of the input beams entering at the more than two inputs. The basic types of the combination device having two inputs and one output, as described further above, in which the coherent combination of the two input beams to form the output beam is carried out by way of a polarization beam splitter or by way of an interferometer, may—if modified appropriately—also be used in a combination device that has more than two inputs and more than one output ("multi-channel coupling device"), as described in more detail further below.

In one development of this embodiment, the combination device has a number of inputs that is twice as great as the number of outputs. In this development, the combination device, in the simplest case, constitutes a parallel arrangement of coupling devices that correspond to one of the two basic forms described above having the two inputs and the one output. However, it is also possible for the basic structure of the respective basic form, that is to say its optical components (where applicable as far as its dimensioning) to be retained in the coupling device, and for the number of inputs or input beams and the number of outputs or output beams just to be scaled by a factor N. In the simplest case, the first input of the combination device described above is replaced by a group of N first inputs through which N parallel-oriented input beams enter the combination device. Accordingly, the second input is replaced by a group of N second inputs through which N further parallel-oriented input beams enter the combination device. The respective pairs of input beams, which are combined to form one of the output beams, in this case pass through the optical components of the combination device with a lateral offset and exit the coupling device at one of N outputs.

In this development, an output beam may likewise be generated from in each case two superimposed input beams, which output beam—apart from parasitic losses during passage through the optical components of the combination device—corresponds to the sum of the powers of the two input beams. The combination device thus makes is possible to generate complete constructive interference of the input beams at the respective output, such that the output beam has the maximum possible power (100% of the sum of the powers of the input beams).

The power of the input beams that enter the combination device at the respective inputs is typically substantially the same for all input beams, that is to say the power of a respective input beam is not used to dynamically set the polarization state or, where applicable, the power of the output beam. In principle, however, it is possible to deviate (generally slightly) from an identical intensity of the input beams in order to ensure the above-described complete constructive interference of the input beams when these are superimposed to form the output beam. This may be needed for example if the losses of the input beams exhibit different magnitudes when passing through the combination device.

In one development, the combination device, in order to coherently combine in each case two of the input beams entering at the inputs to form a respective output beam, has a polarization beam splitter that is preferably common to all input beams and, in order to generate a linear polarization of the respective output beam, has a phase shift element arranged downstream of the polarization beam splitter in the beam path and preferably common to all output beams, in particular a $\lambda/4$ retardation device. As has been described further above, in the event that a common polarization beam splitter is present for all input beams, the input beams of a respective group pass through the polarization beam splitter in a laterally offset manner, and the output beams pass through the common phase shift element in a laterally offset manner. It goes without saying that, as an alternative, a plurality of polarization beam splitters and a plurality of phase shift elements may be used in the combination device to combine the respective pairs of input beams coherently to form a respective output beam or to generate a linear polarization for a respective output beam.

In one development, the combination device is designed to supply in each case two input beams that are to be combined to the polarization beam splitter, which input beams have two mutually perpendicular polarization directions, wherein the combination device preferably has, upstream of the polarization beam splitter in the beam path, a polarization-rotating device for rotating a polarization direction of in each case one of the two input beams that are combined at the polarization beam splitter to form the respective output beam. The polarization-rotating device may be used when the input beams are supplied to the combination device each with the same linear polarization direction, in order to rotate the polarization direction of one of the input beams and to supply the two input beams having a mutually perpendicular polarization direction to the polarization beam splitter. Since the polarization direction of the input beams is prescribed, in this case, a polarization rotation may be brought about by way of a polarization-rotating device in the form of a birefringent retardation device, for example in the form of a $\lambda/2$ retardation element. The polarization direction of one of the two groups of N input beams may be rotated with the aid of a common polarization-rotating device.

Accordingly, one alternative embodiment of the combination device having groups of N first input beams and N second input beams for generating a group of N output beams may also be provided with an interferometer or up to N interferometers.

In one alternative development of the embodiment described further above, the combination device has at least one splitting element for splitting a respective input beam into two partial beams and preferably at least one combination element for coherently combining two of the partial beams to form a respective output beam. In this embodiment, the power of a respective input beam is split into two partial beams prior to the coherent combination (generally preferably in equal parts, that is to say 50:50), one of which is combined in each case with a respective partial beam of another input beam to form one of the output beams. In the case described here, it is therefore usually desired for all of the input beams or at least each input beam and two to be superimposed therewith to be coherent with one other, whereas, in the alternative embodiment described further above, this is needed for in each case only two of the input beams that are combined coherently to form a respective output beam. The relative phase position of the two input beams, the partial beams of which are combined coherently to form an output beam, may be used in this case to set the polarization state of the respective output beam, that is to say the polarization state of a respective output beam may be set individually. Typically, in this case, all input beams have the same amplitude and the same polarization state.

In one development of this embodiment, the combination device has a number of inputs that is one greater than a number of outputs. Since a number of 2 N+2 partial beams are generated when the N+1 input beams are split at the splitting element, but only N outputs are present, the power of an input beam (more precisely, the sum of the powers of two partial beams) is lost in this development. In the case described here, the total power of the input beams is thus not transferred to the power of the (two or more) output beams, that is to say the power of the output beams does not correspond to 100% of the sum of the powers of the input beams. This power of the two partial beams that are not used for the coherent combination may be used as diagnostic beams. As has been described further above, the input beams typically enter the combination device at the inputs in a manner laterally offset from one another, and the inputs are typically likewise laterally offset from one another. The two partial beams that are not combined coherently and that are used as diagnostic beams are typically partial beams of two input beams entering the combination device at the first input and at the last input (N+1). The diagnostic beams may be evaluated directly or in superimposed form for diagnostic purposes. The development described here is expedient if a large number of output beams is desired, since these are able to be generated with a small number of input beams.

Polarization beam splitters may be used for example as splitting element(s) and as combination element(s). In this case, polarization of a respective input beam entering the combination device may be elliptical, with a preferred direction of the elliptical polarization being oriented at 45° to the s-component or to the p-component of the polarization beam splitter. However, the polarization of a respective input beam is preferably selected to be either linearly or circularly polarized. With an orientation of the linear polarization at 45° to the s-component or to the p-component of the polarization beam splitter, the power of a respective input beam is split in equal parts into the partial beams. As in the embodiments described further above, a respective phase shift element—possibly common to all output beams—in particular a $\lambda/4$ retardation device, may be arranged downstream of the polarization beam splitter serving as combination element in the beam path, in order to generate a linear polarization of the respective output beam.

In a further development, the combination device has a number N+1 of polarization beam splitters corresponding to the number N+1 of input beams, which polarization beam splitters each serve as splitting element, and a number N minus one of the polarization beam splitters serves in each case as combination element. In this embodiment, each input is assigned exactly one polarization beam splitter that splits the respective input beam into two partial beams. The polarization beam splitters are arranged such that, in the case of all but one of the polarization beam splitters, in each case one of the partial beams propagates in the direction of the respective output, whereas the respective other partial beam is deflected to a respectively adjacently arranged polarization beam splitter and is superimposed coherently with the partial beam that is transmitted at said polarization beam splitter and propagates to the respective output. In this embodiment, the polarization beam splitters are generally arranged adjacently in a row. The two polarization beam splitters that do not serve as combination element are typically the first and last of the polarization beam splitters in this row. The path length differences occurring in the combination of the partial beams at the polarization beam splitters arranged in the row may be compensated for beforehand for a good coherent combination. To suppress unwanted interference effects between the individual output beams, it may be expedient for a time offset to be generated in pulsed operation between the output beams, this being made easier by the compensation of the path length difference. The embodiment described here does not require any deflection elements and is readily scalable.

In one alternative development, the combination device has a common polarization beam splitter as splitting element common to all input beams and/or the combination device has a common polarization beam splitter as combination element common to all output beams. In particular, one and the same polarization beam splitter may serve as common splitting element and as common combination element. The partial beams that are generated at the common splitting element in the form of the polarization beam splitter may be deflected back to the polarization beam splitter at a respective deflection device, for example in the form of a deflection mirror, in order to perform the coherent combination of the partial beams. This development may likewise be implemented with a compact design.

It goes without saying that a group of input beams that does not comprise all input beams may also be split at a common splitting element and/or combined at a common combination element. The input beams may in principle be combined variably to form groups, which are each split at a common splitting element and/or combined at a common combination element, or which are split at a respective individual splitting element and/or combined at a respective individual combination element.

In one alternative development, the combination device has an interferometer, in particular a Mach-Zehnder interferometer, comprising a first beam channel for propagating a first sub-partial beam and a second beam channel for propagating a second sub-partial beam, wherein the interferometer has a further splitting element for splitting the partial beams of two different input beams into the two beam channels and preferably at least one polarization-influencing device for influencing, in particular in a fixedly prescribed manner, a polarization state, in particular a polarization direction, of at least one of the sub-partial beams.

This embodiment basically corresponds to the basic form of the combination device as described further above, which has two inputs and one output as well as an interferometer for the coherent combination. The embodiment described here differs from the embodiment described further above in that it is not two input beams but rather two groups of partial beams that are supplied to the interferometer, more precisely the further splitting element, wherein each group belongs in each case to one of the two partial beams of a respective input beam that was generated at the (at least one) splitting element. A respective partial beam from one of the two groups is supplied to the further splitting element of the interferometer, at which the split into the two beam arms takes place. Since a coherent combination of the two partial beams takes place at the further splitting element of the interferometer, the partial beams propagating in the two beam arms are referred to as sub-partial beams. The sub-partial beams may be combined to form a respective output beam, as in the embodiment described further above, at a combination element that is part of the interferometer.

The polarization state of a respective output beam may in this case also be set, as described further above, on the basis of the relative phase position of the respective input beams. The path length of the sub-partial beams in the two beam arms of the interferometer is set such that maximum constructive interference is present at the respective output. This makes it possible to transfer in each case half of the sum of the powers of the respectively superimposed partial beams of the input beams to the power of the corresponding output beam.

In one development, the combination device is designed to supply in each case two partial beams of different input beams to the further splitting element, which input beams are oppositely circularly polarized, wherein the combination device preferably has at least one phase-influencing element for influencing the phase of one of the two partial beams. The phase-influencing element may be for example a half-wave retardation element using which the direction of rotation of the circular polarization is reversed.

The partial beams that are split into the two beam arms at the further splitting element of the interferometer are typically circularly and oppositely polarized in relation to one another. In this case, the perpendicular orientation of the polarization direction of the sub-partial beams in the two beam arms may be converted to a parallel orientation using the polarization-rotating device in the interferometer, as has been described further above. To generate the oppositely circularly polarized partial beams, input beams having circular polarization with the same direction of rotation may be provided at the inputs of the combination device, for example. The (at least one) phase-influencing element may be used to influence the phase of one of the two partial beams generated at the splitting element such that the direction of rotation of the circular polarization of this partial beam is reversed, such that the two partial beams at the further splitting element of the interferometer have oppositely circular polarization.

Embodiments of the invention also relate to an optical system, comprising: a beam source for generating a laser beam, a splitting device for splitting the laser beam into at least two coherent input beams, a phase modulation device for modulating the relative phase positions of the input beams, and a combination device, which is designed as described further above, for forming at least one output beam through coherent combination of the at least two input beams. The optical system and also the combination device may be implemented with discrete optical components, using fiber-optics, using integrated optics or else as a hybrid system.

The beam source is preferably a seed laser of a MOPA (Master Oscillator Power Amplifier) system. In this case, the input beams are generated by amplifying the seed laser beam. It is possible in principle to arrange the phase modulation device directly upstream of the inputs of the combination device in the beam path. If a MOPA system is involved, however, it is expedient for the relative phase positions of the input beams to be set with the aid of a phase modulation device that is arranged upstream of the power amplifier of the MOPA system. It is thereby possible, in the phase modulation device, to use optical elements that do not have to have either high performance or high efficiency. The average power and/or peak power of the at least one output beam may be high in such a MOPA system, and be for example more than 1 W, 10 W, 1 kW, 10 kW or even 1 MW.

The at least one output beam is typically supplied to an application device of the optical system, which is generally a processing device for processing purposes, for example a processing head, for processing a workpiece with the aid of the output beam. Translation units for moving the processing head and/or the workpiece may also be provided in order to position the one or more output beams relative to the workpiece. Dynamic beam positioning (2 D, 2.5 D), spatio-temporal beamforming, position detection (prior to the process) and process control (in-situ, ex-situ) may also be performed.

When the at least one output beam is supplied to the workpiece, polarization influencing may also be carried out in the application device. By way of example, the application device, in order to supply the output beam to the workpiece, may have a birefringent component, for example an optical fiber, in particular a fiber-based amplifier. In this case, the combination device may perform preliminary compensation of the birefringence generated when the output beam is supplied to the workpiece. Typically, the preliminary compensation is performed by appropriately adjusting the relative phase positions that are set by the phase modulation device, so as to achieve the desired combination of polarization state and power of the output beam at the workpiece. It is thereby possible to use non-polarization-preserving transport fibers as well or to modify the MOPA concept by virtue of the superimposition taking place upstream of the (typically fiber-based) power amplifier, which in this case is integrated into the application device.

In addition to using the optical system for voxel writing for data storage in transparent materials, the optical system may also be used inter alia for the production of optical components based on spatially dependent polarization manipulation. The rapid polarization change generated by the optical system may also be used advantageously for other applications, for example for analytical methods.

The optical system may also have a conversion device that is arranged between the phase modulation device and the combination device. The conversion device may be an optical amplifier device, for example the one or more power amplifiers of the MOPA system described further above. The conversion device may also perform another function.

The conversion device may for example be designed for frequency conversion of the input beams. This is expedient because wavelengths for which no high-performance amplifier system, no high-performance phase modulation device or other optical components are available are often of interest for the (respective) output beam or for the application for which the (respective) output beam is used. In this case, the coherent coupling in the combination device may be combined with a frequency conversion that generally takes place upstream of the combination device in the beam path. The optical system described here, in particular in the form of a MOPA system, is compatible with a frequency conversion device arranged between the beam source and the combination arrangement.

The beam source for generating the laser beam may be designed to generate a cw laser beam and/or a pulsed laser beam. The beam source may in particular be designed to generate an ultrashort pulse laser beam containing laser pulses whose pulse durations are of the order of ps or fs. In the case of ultrashort pulse lasers, use is often made of what is known as chirped pulse amplification (CPA), in which temporally stretched pulses are amplified and then compressed. CPA technology may be combined with the coherent coupling of the four input beams to form the output beam, as described here, and in particular with the independent setting of the polarization state and the power of the output beam. In this case, the conversion device may for example include a pulse compressor of the CPA system. The conversion device may however also generally be designed for pulse shaping of the input beams, which are pulsed in this case.

It goes without saying that the conversion device may also be designed to perform several of the functions described further above or that the optical system may have a plurality of conversion devices in order to set beam parameters adjusted to the respective application.

An appropriate beam guide, which may for example comprise scanner optics, may be provided in the beam path between the beam source and the combination device, in particular in the beam path between the conversion device and the combination device, and in the beam path of the one or more output beams downstream of the combination device.

In one embodiment, the optical system is designed to supply the input beams to the inputs of the combination device with substantially the same power. As has been described further above, it is expedient for the coherent combination when the mutually coherent input beams have substantially the same power or intensity. This may be achieved for example when the power of a laser beam that is generated by the beam source is split in equal parts into the mutually coherent input beams in the splitting device. As has been described further above, it is possible to deviate from an identical power of the input beams if these experience different losses when passing through the combination device. The power of the individual input beams may be adjusted in order to compensate for the different losses when passing through the combination device, so as to generate optimum interference contrast in the coherent combination.

In a further embodiment, the optical system is designed to supply linearly polarized input beams to the inputs of the combination device having a prescribed polarization direction or having circular polarization. As has been described further above, it is expedient when the input beams are supplied to the combination device with a defined polarization state that is dependent on the respective configuration of the combination device.

Further advantages of the invention will become apparent from the description and the drawing. Likewise, the features mentioned above and those that are yet to be presented may be used in each case by themselves or as a plurality in any desired combinations. The embodiments shown and described should not be understood as an exhaustive enumeration, but rather are of an exemplary character for outlining the invention.

In the following description of the drawings, identical reference signs are used for identical or functionally identical components.

FIG. 1*a* shows a combination device 3 for coherently combining two mutually coherent input beams 1.1, 1.2 to form a combined output beam 2.1. The combination device 3 has two inputs E1, E2, which allow a respective one of the input beams 1.1, 1.2 to enter. The combination device 3 also has an output A1, which allows the output beam 2.1 formed in the coherent superposition to exit. The combination device 3 is designed to superimpose the two input beams 1.1, 1.2 collinearly, wherein, in the example shown, a congruent superposition takes place to form the output beam 2.1.

The combination device 3 shown in FIG. 1*a* makes it possible to set the polarization state of the output beam 2.1. In the examples shown, the polarization state that is set with the aid of the combination device 3 is the polarization direction R of a linearly polarized output beam 2.1.

While the beam curves in FIGS. 1*a* and 1*n* the following figures are illustrated in the plane of the drawing, the polarization states are illustrated in a propagation direction perpendicular to the plane of the drawing. The Y-direction of the polarization states shown in FIG. 1*a* corresponds here to the s-component, and the X-direction corresponds to the p-component of the polarization.

The combination device 3 shown in FIG. 1*a* makes it possible to set a power PA of the output beam 2.1, which power—apart from parasitic losses when passing through the optical elements of the combination device 3—corresponds to the sum of the powers P1, P2 of the input beams 1.1, 1.2 that are combined coherently to form the output beam 2.1.

The setting of the polarization direction R of the output beam 2.1 is made possible by setting a relative phase position 412 of the phases 41, 42 of the two input beams 1.1, 1.2 illustrated in FIG. 1*a*. The polarization direction R of the output beam 2.1 is typically set exclusively by setting the relative phase position 412 of the two input beams 1.1, 1.2, that is to say without other parameters of the two input beams 1.1, 1.2 or parameters of optical components of the combination device 3 being changed for this purpose. The powers P1, P2 of the input beams 1.1, 1.2 are generally the same, or they are selected to be different in order to perform preliminary compensation of parasitic losses. The powers P1, P2 of the two input beams 1.1, 1.2 are likewise not changed for the setting. Since the relative phase position 412 of the two input beams 1.1, 1.2 is able to be set highly dynamically, the polarization direction R of the output beam 2.1 may also be set highly dynamically with the aid of the combination device 3.

The combination device 3 shown in FIG. 1*a* has a polarization beam splitter 4 for the coherent superposition of the first and second input beam 1.1, 1.2. The polarization beam splitter 4 is shown in FIGS. 1*a* and 1*n* the following figures with a dot and a double-headed arrow to distinguish it from other, non-polarization-sensitive components, for example from intensity beam splitters. As may likewise be seen in FIG. 1*a*, the polarization directions R1, R2 of the two input beams 1.1, 1.2 are oriented perpendicular to one another. The polarizer axes of the polarization beam splitter 4 are oriented parallel to the polarization directions R1, R2 of the respective input beams 1.1, 1.2 in order to generate maximum transmission of the first input beam 1.1 and maximum reflection of the second input beam 1.2 at the polarization beam splitter 4.

During the coherent combination of the input beams 1.1, 1.2 entering the polarization beam splitter 4, an elliptically polarized exiting beam is formed in which the half-axes (preferred axes or directions) of the elliptical polarization are oriented at 45° to the two mutually perpendicular polarization directions R1, R2 of the input beams 1.1, 1.2. As a result of an orientation of the preferred axis of a phase shift element in the form of a λ/4 retardation device 5 matching the 45° preferred direction, the elliptical polarization is converted into a linear polarization of the output beam 2.1 whose polarization direction R is determined by the principal axis ratio and the direction of rotation of the elliptical polarization. Setting the relative phase position Δφ12 between the input beams 1.1, 1.2 entering the polarization beam splitter 4 changes the aspect ratio between the half-axes of the elliptical polarization, but does not change the orientation of the half-axes at 45° to the two mutually perpendicular polarization directions R1, R2. Setting the relative phase position Δφ12 of the two input beams 1.1, 1.2 therefore makes it possible to set the polarization direction R of the linearly polarized output beam 2.1. In the combination device 3 shown in FIG. 1*a*, the two input beams 1.1, 1.2 are oriented in parallel and the second input beam 1.2 is deflected by 90° at a deflection mirror 6 upstream of the polarization beam splitter 4 in the beam path, but this is not absolutely necessary.

The combination device 3 illustrated in FIG. 1*b* differs from the combination device 3 illustrated in FIG. 1*a* in that it has a number 2N of inputs E1, . . . , E2N+1 (N>1, for example N=2, 3, 4, 5, . . . ) that is twice as great as the number N of outputs A1, . . . , AN. The combination device 3 is used to coherently combine in each case two 1.1, 1.N+1; 1.2, 1.N+2; . . . of the input beams 1.1, . . . , 1.N entering at the inputs E1, . . . , E2N+1 to form a respective output beam A1, . . . , AN.

As may be seen in FIG. 1*b*, a first group of N input beams 1.1, . . . , 1.N is directly irradiated here onto a polarization beam splitter 4 common to all input beams 1.1, . . . , 1.2N, and a second group of N input beams 1.N+1, . . . , 1.2N is deflected to the polarization beam splitter 4 via a deflection mirror 6. The coherent combination of in each case one of the input beams 1.1, . . . , 1.N of the first group with in each case one of the input beams 1.N+1, . . . , 1.2N of the second group at the polarization beam splitter 4 takes place as described in connection with FIG. 1*a*, so as to form N output beams 2.1, . . . , 2.N. The input beams 1.1, . . . , 1.2N, which are combined to form different output beams 2.1, . . . , 2.N, in this case impinge on the common polarization beam splitter 4 at positions that are laterally offset in relation to one another. A phase shift element, in the form of a λ/4 retardation device 5, common to all output beams 2.1, . . . , 2.N serves to generate a linear polarization of the respective output beam 2.1, . . . , 2.N. The polarization direction of a respective linearly polarized output beam 2.1, . . . , 2.N may be set individually with the aid of the relative phase between the respective input beams 1.1, 1.N+2, 1.2, . . . , 1.N+1, as illustrated in FIG. 1*b* by differently oriented arrows.

The combination device 3 illustrated in FIG. 1*b* is supplied with all input beams 1.1, . . . , 1.2N at the inputs E1, . . . , EN having the same polarization direction R1. To achieve a perpendicular orientation of the polarization directions R1, R2 of the respective input beams 1.1, 1.N+2; 1.2, 1.N+1, . . . superimposed coherently at the polarization beam splitter 4, the second group of input beams 1.N+1, . . . , 1.2N passes through a polarization-rotating device 7, which is designed as a λ/2 retardation element in the example shown, in order to rotate the polarization direction of the second group of input beams 1.N+1, . . . , 1.2N by 90° before they impinge on the polarization beam splitter 4.

FIG. 2*a*,*b* show two examples of combination devices 3, which differ from the combination devices 3 shown in FIG. 1*a*,*b* in that they have a number N+1 of inputs E1, . . . , EN+1 that is one greater than the number N of outputs A1, . . . , AN. The combination devices 3 are designed to split the N+1 input beams 1.1, . . . , 1.N+1 into in each case two partial beams 8.1*a*, 8.1*b*; 8.2*a*, 8.2*b*, . . . , 8.N+1*a*, 8.N+1*b*, which—with the exception of two of the partial beams 8.1*b*, 8.N+1*a*, which serve as diagnostic beams D1, DN+1—are combined coherently to form one of the N output beams 2.1, . . . , 2.N. A number of polarization beam splitters 4.1, . . . , 4.N+1 corresponding to the number N+1 of inputs E1, . . . , EN+1 is used in the combination device 3 illustrated in FIG. 2*a* as splitting elements, whereas a common polarization beam splitter 4 is used for this purpose in FIG. 2*b*.

In the combination device 3 shown in FIG. 2*a*, the first N polarization beam splitters 4.1, . . . , 4.N serve as combination element for coherently combining a first partial beam 8.1*a*, . . . , 8.N*a* of a respective input beam 1.1, . . . , 1.N, which is irradiated from an associated input E1, . . . , EN onto the respective polarization beam splitter 4.1, . . . , 4.N and is transmitted thereby, with a second partial beam 8.2*b*, 8.N+1*b* of a respectively adjacent input beam 1.2, . . . , 1.N+1, which is reflected by the adjacent polarization beam splitter 4.2, . . . , 4.N+1 associated with this input beam 1.2, . . . , 1.N+1. The output beams 2.1, . . . , 2.N are linearly polarized with the aid of a respective phase shift device 5.1, . . . , 5.N. The polarization direction of a respective linearly polarized output beam 2.1, . . . , 2.N may be set, as with the combination devices 3 described further above, by appropriately defining the relative phase position of in each case two adjacent input beams 1.1, . . . , 1.N.

In the example shown in FIG. 2*b*, a common polarization beam splitter 4 serves both as common splitting element for splitting all input beams 1.1, . . . , 1.N+1 into in each case two partial beams 8.1*a*, 8.1*b*; 8.2*a*, 8.2*b*, . . . . The polarization beam splitter 4 also serves as common combination element for combining in each case two of the partial beams 8.1*a*, 8.2*b*; 8.2*a*, 8.3*b*, . . . of adjacent input beams 1.1, . . . , 1.N to form a respective output beam 2.1, . . . , 2.N. In order to be able to use the polarization beam splitter 4 both as splitting element and as combination element, a group of first partial beams 8.1*a*, . . . , 8.1N*a* that are transmitted by the polarization beam splitter 4 is deflected by 90° back to the polarization beam splitter 4 at a first deflection mirror 6*a*, and a group of second partial beams 8.1*b*, . . . 8.N+1*b* is deflected back to the polarization beam splitter 4 by a second deflection mirror 6*b*. The first partial beam 8.1*a* of the first input beam 1.1 and the second partial beam 8.N+1*b* of the N+1-th input beam 1.N+1 serve as diagnostic beams D1, DN+1 and are not used for the coherent combination. In the combination device 3 illustrated in FIG. 2*b*, a common phase shift device in the form of a λ/4 retardation device 5 is used to generate a linear polarization of the respective output beam 2.1, . . . , 2.N with a settable polarization direction.

FIG. 3*a* shows a combination device 3, which, like the combination device 3 shown in FIG. 1*a*, has two inputs E1, E2 for the entry of a respective input beam 1.1, 1.2 and one output A1 for the exit of an output beam 2.1. The combination device 3 comprises a Mach-Zehnder interferometer 9, which has a first beam channel 12*a* for propagating a first partial beam Ta and a second beam channel 12*b* for propagating a second partial beam Tb. The Mach-Zehnder interferometer 9 also comprises a splitting element 10 in the form of an intensity beam splitter for splitting the two input beams 1.1, 1.2 into the two partial beams Ta, Tb and a combination element 11 in the form of an intensity beam splitter for coherently combining the two partial beams Ta, Tb to form the output beam 2.1. A first reflector in the form of a deflection mirror 6*a* is arranged in the first beam channel 12*a* and deflects the first partial beam Ta by 90° to the combination element 11. Accordingly, a second reflector 6*b* in the form of a deflection mirror is arranged in the second beam channel 12*b* and deflects the second partial beam Tb by 90° to the combination element 11.

For the coherent combination, the first input beam 1.1 and the second input beam 1.2 are supplied to the combination device 3 with circular polarization, that is to say with a circular polarization state, wherein a direction of rotation D1 of the circular polarization state of the first input beam 1.1 runs opposite to a direction of rotation D2 of the circular polarization state of the second input beam 1.2. As may likewise be seen in FIG. 3*a*, the second input beam 1.2 is deflected by 90° to the splitting element 10 of the Mach-Zehnder interferometer 9 at a further reflector in the form of a further deflection mirror 6*c*.

In the coherent combination at the splitting element 10 of the Mach-Zehnder interferometer 9, the two partial beams Ta, Tb described further above are formed from the two oppositely circularly polarized input beams 1.1, 1.2, which partial beams are linearly polarized and have polarization directions R1, R2 that are initially rotated by 90° in relation to one another, but the polarization direction R1 of the first partial beam Ta is rotated by 90° with the aid of a polarization-influencing device in the form of an optical rotator 13, more precisely a suitably oriented quartz crystal, arranged in the Mach-Zehnder interferometer 9, such that the polarization direction R1 of the first partial beam Ta, after passing through the optical rotator 13, is oriented parallel to the polarization direction R2 of the second partial beam Tb.

It goes without saying that such a parallel orientation of the polarization directions R1, R2 of the two partial beams Ta, Tb may also be achieved when, instead of a single optical rotator 13, two or more optical rotators are arranged in the respective beam channels 12*a*, 12*b*, these bringing about a suitable rotation of the respective polarization directions R1, R2 of the two partial beams Ta, Tb. Setting the relative phase position 412 between the first input beam 1.1 and the second input beam 1.2 makes it possible to set the polarization direction R1, R2 of the two partial beams Ta, Tb and thus the polarization direction R of the linearly polarized output beam 2.1 of the combination device 3 in the coherent combination. Instead of the intensity beam splitters, polarization beam splitters may also be used in the Mach-Zehnder interferometer 9 as splitting element 10 and as combination element 11.

FIG. 3*b* shows a combination device 3 that differs from the combination device 3 shown in FIG. 3*a* in that it has a number of four inputs E1 to E4 and a number of three outputs A1 to A3. The combination device 3 of FIG. 3*b* thus constitutes a special case (N=3) of a combination device 3 having a number of N+1 inputs and N outputs. As has been described further above in connection with FIG. 2*a*,*b*, the combination device 3 has a splitting element 10, which is designed as an intensity beam splitter in FIG. 3*b* and which splits four input beams 1.1 to 1.4, entering the combination device 3 at the respective inputs E1 to E4, into in each case a first partial beam 8.1*a* to 8.3*a*, D4, and into a second partial beam D1, 8.2*b* to 8.4*b*. As has been described further above in connection with FIG. 2*a*,*b*, the second partial beam of the first input beam 1.1 serves as diagnostic beam D1. Accordingly, the first partial beam of the fourth input beam 1.4 also serves as diagnostic beam D4. The remaining first partial beams 8.1*a* to 8.3*a* are each combined in pairs with the second partial beams 8.2*b* to 8.4*b* to form the three output beams 2.1 to 2.3, which exit at the three outputs A1, A2, A3.

The splitting of a respective pair of partial beams 8.1*a*, 8.2.*b*; 8.2*a*, 8.3*b*; 8.3*a*, 8.4*b* of adjacent input beams 1.1 to 1.4 into one of three first sub-partial beams T1*a*, T2*a*, T3*a* that pass through the first beam arm 12*a*, and into one of three second sub-partial beams T1*b*, T2*b*, T3*b*, which pass through the second beam arm 12*b*, is carried out at a further splitting element 14 of the interferometer 9, which is designed in the form of an intensity beam splitter, which, in the example shown in FIG. 3*b*, also serves as splitting element 10 and as combination element 11.

The input beams 1.1 to 1.4 enter the combination device 3 at the inputs E1 to E4 in circularly polarized form and have a first direction of rotation D1. The second partial beams D1, 8.2*b* to 8.4*b* of the four input beams 1.1 to 1.4 pass through a phase-influencing element 15 upstream of the further splitting element 14 in the beam path, which phase-influencing element serves to reverse the direction of rotation D1 of the circular polarization of the second partial beams D1, 8.2*b* to 8.4*b*. The first partial beams 8.1*a* to 8.3*a*, D4 and the second partial beams D1, 8.2*b* to 8.4*b* therefore impinge on the further splitting device 14 in circularly polarized form and with an opposing direction of rotation D1, D2. The coherent combination in the interferometer 9 takes place using an optical rotator 13, as has been described further above in connection with FIG. 3*a*. The combination device 3 also has three reflectors in the form of deflection mirrors 6*a*,*c*, 6*a*, 6*d*.

FIG. 4 shows an optical system 30 having a beam source 31 for generating a laser beam E and a splitting device 32 for splitting the laser beam E (more precisely, the power of the laser beam E) in equal parts into the two mutually coherent input beams 1.1, 1.2, such that the two input beams 1.1, 1.2 have identical powers following the split. The optical system 30 furthermore comprises a phase modulation device 33 that is designed for the rapid modulation of the relative phase position Δφ12 (see FIG. 1*a*) of the two laser beams 1, 2, which, following an (optional) conversion (see below), form the two input beams 1.1, 1.2 of the combination device 3, which is arranged downstream of the phase modulation device 33 in the beam path. In the optical system 30 shown in FIG. 4, the splitting device 32 is arranged in the beam source 31 and the beam source 31 couples the two input beams 1.1, 1.2 into the phase modulation device 33.

In the example shown, the combination device 3 is designed as shown in FIG. 1*a* and superimposes the two input beams 1.1, 1.2 coherently to form the output beam 2.1. The combination device 3 may also be designed as illustrated in FIG. 1*b*, FIG. 2*a*,*b* or as illustrated in FIG. 3*a*,*b*, and in this case has a correspondingly adjusted number of inputs and outputs.

The optical system 30 has an application device 34 which, in the example shown, is a processing device in the form of a processing head that serves to process a workpiece with the aid of the output beam 2.1. To position the output beam 2.1 or a plurality of output beams 2.1, 2.2, . . . relative to the workpiece, the application device 34 may have translation units for moving the processing head and/or the workpiece. The application device may also have a scanner device for dynamic beam positioning (2 D, 2.5 D) and/or be designed to perform spatio-temporal beamforming, position detection (prior to the process) and/or process control (in-situ, ex-situ).

In the optical system 30, a conversion device 35 is arranged between the phase modulation device 33 and the combination device 3. The conversion device 35 may perform one or more functions and be designed in various ways, as will be described in more detail below.

In the example shown in FIG. 4, the beam source 31 is a seed laser of a MOPA (Master Oscillator Power Amplifier) system. In this case, the conversion device 35 includes at least one power amplifier of the MOPA system, in which the two input beams 1.1, 1.2 are amplified before being supplied to the combination device 3. In this case, the phase modulation device 33 is arranged upstream of the power amplifier or the conversion device 35 in the beam path. This is expedient since it is possible in this case, in the phase modulation device 33, to use optical components that do not have to have either high performance or high efficiency. As part of a suitable overall system design, the seed laser typically has a low but suitable power, by virtue of pre-amplification already taking place in the seed laser if required. The average power and/or peak power of the output beam 2.1, on the other hand, is large in the case of an optical system 30 in the form of a MOPA system due to the use of the power amplifier. The conversion device 35 of the optical system 30 may however also be a different type of optical amplifier.

The beam source 31 may be designed to generate a c/w laser beam and/or a pulsed laser beam E. The beam source 31 may for example generate an ultrashort pulse laser beam containing laser pulses whose pulse durations are of the order of ps or fs. In the case of ultrashort pulse lasers, use is often made of what is known as chirped pulse amplification (CPA), in which temporally stretched pulses are amplified and then compressed. The beam source in this case typically provides temporally stretched pulses, wherein the stretching takes place upstream of the splitting device 32. CPA technology may be combined with the coherent coupling, as described here, of the two input beams 1.1, 1.2 to form the output beam 2.1 in the combination device 3. In this case, the conversion device 35 may for example form or include a pulse compressor of the CPA system. The conversion device 35 may however also generally be designed for pulse shaping of the input beams 1.1, 1.2, which are pulsed in this case.

The conversion device 35 may also be used for frequency conversion of the input beams 1.1, 1.2. In this case, the coherent superposition in the combination device 3 is combined with a frequency conversion that takes place in the conversion device 35 upstream of the combination device 3 in the beam path. The optical system 30, also in the form of a MOPA system, is compatible with a frequency conversion device arranged between the beam source 31 and the combination device 3.

It goes without saying that the conversion device 35 may also be designed to perform several of the functions described above, or other functions. By way of example, the conversion device 35 may be used to set or to adjust the beam parameters or pulse parameters required for the respective application, such as pulse energy, pulse duration, etc. The conversion device 35 may also be used for beam transport or for flexible beam guidance. The optical system 30 may also have a plurality of conversion devices 35.

By way of example, a conversion device 35 may be integrated into the application device 34 and serve to influence the polarization of the output beam 2.1. By way of example, the application device 34 or the conversion device 35, in order to supply the output beam 2.1 to the workpiece, may have a birefringent component, for example an optical fiber, in particular a fiber-based amplifier. In this case, the combination device 3 may perform preliminary compensation of the birefringence generated when the output beam 6 is supplied to the workpiece. Typically, the preliminary compensation is carried out by appropriately adjusting the relative phase position $\Delta\varphi12$ that is set by the phase modulation device 33, so as to achieve the desired polarization state or the polarization direction R of the output beam 2.1 at the workpiece. It is thereby possible to use non-polarization-preserving transport fibers in the optical system 30 as well or to modify the MOPA concept by virtue of the superimposition taking place upstream of the (typically fiber-based) power amplifier, which in this case is integrated into the application device 34.

The optical system 30 described further above may be used for example to write voxels to transparent materials for data storage. The optical system 30 may also be used to produce optical components based on spatially dependent polarization manipulation. The rapid polarization change generated by the optical system 30 may also be used advantageously for other applications, for example for analytical methods. It goes without saying that the functionalities that are implemented with the aid of the optical components or component parts of the optical system 30 that are described further above may also be implemented with the aid of differently designed optical components that perform the same functionality.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A combination device, comprising:
at least two inputs, each input for entry of a respective input beam of at least two input beams, and
one or more outputs, each output for exit of a respective output beam,
wherein the combination device is configured to form the respective output beam through a coherent combination of two input beams of the at least two input beams by collinear superposition of the two input beams,
wherein the combination device is configured to set a polarization direction of the respective output beam based on a relative phase position of individual phases of the two input beams from which the respective output beam is formed through the coherent combination.

2. The combination device as claimed in claim 1, wherein the at least two inputs comprise exactly two inputs, and the one or more outputs comprise only one output, the combination device further comprising:
a polarization beam splitter for the coherent combination of the two input beams entering at the two inputs to form the output beam, and
a phase shift element arranged downstream of the polarization beam splitter in a beam path, for generating a linear polarization of the output beam.

3. The combination device as claimed in claim 1, wherein the at least two inputs comprise exactly two inputs, and the one or more outputs comprise only one output, the combination device further comprising:
an interferometer having a first beam channel for propagating a first partial beam and a second beam channel for propagating a second partial beam, wherein the interferometer comprises:
a splitting element for splitting the two input beams into the first partial beam and the second partial beam,
a combination element for coherently combining the first partial beam and the second partial beam to form the output beam, and
at least one polarization-influencing device for influencing, in a fixedly prescribed manner, a polarization direction of at least one of the first partial beam and the second partial beam.

4. The combination device as claimed in claim 1, wherein the at least two inputs comprise more than two inputs, and the one or more outputs comprise a plurality of outputs, and the combination device is configured to form a respective output beam exiting at a respective output through a coherent combination of in each case two of the input beams entering at the more than two inputs.

5. The combination device as claimed in claim 4, wherein a number of inputs is twice as great as a number of outputs, and the combination device is configured to combine in each case two of the input beams entering at the inputs coherently to form a respective output beam.

6. The combination device as claimed in claim 5, further comprising:
a polarization beam splitter for coherently combining in each case two of the input beams entering at the inputs to form the respective output beam, wherein the polarization beam splitter is common to all input beams, and,
a phase shift element for generating a linear polarization of the respective output beam, wherein the phase shift element is arranged downstream of the polarization beam splitter in a beam path and is common to all output beams.

7. The combination device as claimed in claim 6, being configured to supply in each case the two of the input beams that are to be combined to the polarization beam splitter, wherein the two of the input beams have two mutually perpendicular polarization directions, the combination device further comprising, upstream of the polarization beam splitter in the beam path, a polarization-rotating device for rotating a polarization direction of in each case one of the two of the input beams that are combined at the polarization beam splitter to form the respective output beam.

8. The combination device as claimed in claim 4, further comprising at least one splitting element for splitting a respective input beam into two partial beams, and at least one combination element for coherently combining the two partial beams to form the respective output beam.

9. The combination device as claimed in claim 8, wherein a number of inputs is one greater than a number of outputs, and the combination device is configured to coherently combine a number of pairs of partial beams corresponding to the number of outputs to form in each case one of the output beams.

10. The combination device as claimed in claim 9, comprising a number of polarization beam splitters corresponding to a number of input beams, wherein each polarization beam splitter serves as one of the at least one splitting element, wherein the number minus one of the polarization beam splitters serves in each case as one of the at least one combination element.

11. The combination device as claimed in claim 8, comprising a common polarization beam splitter that serves as the at least one splitting element common to all input beams and/or as the at least one combination element common to all output beams.

12. The combination device as claimed in claim 8, comprising:

an interferometer that comprises a first beam channel for propagating a respective first sub-partial beam and a second beam channel for propagating a respective second sub-partial beam, wherein the interferometer has a further splitting element for splitting the two partial beams of two different input beams into the first beam channel and the second beam channel, and at least one polarization-influencing device for influencing, in a fixedly prescribed manner, a polarization direction of at least one of the first sub-partial beam and the second sub-partial beam.

13. The combination device as claimed in claim 12, being configured to supply in each case the two partial beams of the two different input beams to the further splitting element, wherein the two different input beams are oppositely circularly polarized, wherein the combination device has at least one phase-influencing element for influencing a phase of in each case one of the two partial beams.

14. An optical system comprising:

a beam source for generating a laser beam, a splitting device for splitting the laser beam into at least two coherent input beams, a phase modulation device for modulating a relative phase position of the at least two input beams, and a combination device as claimed in claim 1 for forming at least one output beam through coherent combination of the at least two input beams.

15. The optical system as claimed in claim 14, being configured to supply the at least two input beams to the inputs of the combination device with substantially a same power.

16. The optical system as claimed in claim 14, being configured to supply the at least two input beams to the inputs of the combination device with linear polarization having a prescribed polarization direction or having circular polarization.

\* \* \* \* \*